US006714669B2

(12) United States Patent
Some

(10) Patent No.: US 6,714,669 B2
(45) Date of Patent: Mar. 30, 2004

(54) IMAGE PROCESSING APPARATUS

(75) Inventor: Masato Some, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 539 days.

(21) Appl. No.: 09/820,868

(22) Filed: Mar. 30, 2001

(65) Prior Publication Data

US 2002/0003895 A1 Jan. 10, 2002

(30) Foreign Application Priority Data

Mar. 30, 2000 (JP) ........................................ 2000-093971

(51) Int. Cl.[7] ................................................ G06K 9/00
(52) U.S. Cl. ........................................................ 382/132
(58) Field of Search ................................. 382/128, 130, 382/131, 132, 203, 209, 216, 217, 219, 220, 221; 378/4, 21, 22, 28, 37, 62, 63, 64, 98.6, 162, 163, 165, 166, 182; 250/317.1, 318, 330, 582, 584, 370.09, 390.02, 559.05, 559.06; 600/411, 414, 425, 443, 444, 445

(56) References Cited

U.S. PATENT DOCUMENTS 5,623,560 A * 4/1997 Nakajima et al. ........... 382/295
5,841,148 A * 11/1998 Some et al. ................. 250/584
6,226,418 B1 * 5/2001 Miller et al. ................ 382/294

* cited by examiner

Primary Examiner—Andrew W. Johns
Assistant Examiner—Shervin Nakhjavan

(74) Attorney, Agent, or Firm—Sughrue Mion, PLLC

(57) ABSTRACT

An image processing apparatus includes a temporary memory for two-dimensionally mapping and temporarily storing image data containing image region data corresponding to two image regions having a similar shape and stored in an image data memory, a CRT for reproducing images based on the image data stored in the temporary memory, an interest region defining section for defining a region of interest in one of the two image regions having a similar shape displayed on the CRT, a pixel specifying section for specifying a first reference pixel in the one of the two image regions having a similar shape and specifying a second pixel corresponding to the first reference pixel in one image region other than the one of two image regions, a copy section for copying the region of interest defined by the interest region defining section and the first reference pixel specified by the pixel specifying section, a template matching section for effecting template matching between minute region image data corresponding to a minute region containing the coordinate value of the first reference pixel as a center coordinate value and minute region image data corresponding to a minute region containing the coordinate value of the second reference pixel corresponding to the first reference pixel as a center coordinate value, and an affine conversion section for effecting an affine conversion on image data corresponding to an outer periphery of the region of interest stored in the temporary memory based on the result of the template. The thus constituted image processing apparatus can easily define image regions corresponding to each other in two images or image regions corresponding to each other in an image as regions of interest using the same figure.

15 Claims, 10 Drawing Sheets

IMAGE PROCESSING APPARATUS

BACKGROUND OF THE INVENTION

The present invention relates to an image processing apparatus and, particularly, to such an apparatus which can easily define image regions corresponding to each other in a plurality of images or image regions corresponding to each other in an image as regions of interest using the same figure.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Application Laid Open Nos. 55-12429, 55-116340, 55-163472, 56-11395, 56-104645 and the like).

There is also known an autoradiographic image detection system comprising the steps of employing a similar stimulable phosphor as a detecting material for the radiation, introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see, for example, Japanese Patent Publication No. 1-60784, Japanese Patent Publication No. 1-60782, Japanese Patent Publication No. 4-3952 and the like).

There is further known a chemiluminescent image detection system using as a detecting material for detecting light a stimulable phosphor which can absorb, store and record the light energy when it is irradiated with light and which, when it is then stimulated by an electromagnetic wave having a specified wavelength, can release stimulated emission whose light amount corresponds to the amount of light radiation with which it was irradiated, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information (see, for example, U.S. Pat. No. 5,028,793, British Patent Publication GB No. 2,246,197A and the like).

There are further known an electron microscopic image detection system and a radiographic diffraction image detection system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see, for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development, which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence system using a fluorescent substance as a labeling substance instead of a radioactively labeling substance in the autoradiographic image detecting system is known. According to this system, it is possible to study a genetic sequence, study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

It is often required for such systems to define image regions corresponding to each other in a plurality of images of encephalon slices of a test mouse displayed on a display means such as a CRT as regions of interest using the same figure or define spots corresponding to each other in different lanes in an electrophoresis image as regions of interest using the same figure.

In these cases, conventionally the only way available to the user is to view the screen of a CRT or the like and draw a figure so as to surround corresponding image regions, thereby defining regions of interest, and it is extremely difficult to define image regions corresponding to each other in a plurality of images or image regions corresponding to each other in an image as regions of interest using the same figure.

SUMMARY OF THE INVENTION

It is therefore an object of the present invention to provide an image processing apparatus which can easily define image regions corresponding to each other in a plurality of images or image regions corresponding to each other in an image as regions of interest using the same figure.

The above other objects of the present invention can be accomplished by an image processing apparatus comprising a temporary memory means for two-dimensionally mapping and temporarily storing image data containing image region data corresponding to at least two image regions having a similar shape and stored in an image data storing means, a display means for reproducing images based on the image data stored in the temporary memory means, an interest region defining means for defining a region of interest in one of the at least two image regions having a similar shape displayed on the display means, a pixel specifying means for specifying at least one first reference pixel in the one of the at least two image regions having a similar shape and specifying a second pixel corresponding to the first reference pixel in at least one image region other than the one of the at least two image regions, a copy means for copying the region of interest defined by the interest region defining means and the at least one first reference pixel specified by the pixel specifying means, a template matching means for effecting template matching between minute region image data corresponding to a minute region containing the coordinate value of the at least one first reference pixel as a center coordinate value and minute region image data corresponding to a minute region containing the coordinate value of the at least one second reference pixel corresponding to the at least one first reference pixel as a center coordinate value, and an affine conversion means for effecting an affine conversion on image data corresponding to an outer periphery of the region of interest stored in the temporary memory means based on the result of the template matching made by the template matching means.

According to the present invention, image regions corresponding to each other in a plurality of images or image regions corresponding to each other in an image can be defined as regions of interest using the same figure merely by copying the region of interest defined in the one image and the at least one first reference pixel into the other image, and effecting template matching between minute region image data corresponding to a minute region containing the coordinate value of the at least one first reference pixel as a center coordinate value and minute region image data corresponding to a minute region containing the coordinate value of the at least one second reference pixel as a center coordinate value.

Further, according to the present invention, even when image data have been produced based on a plurality of images rotated relatively to each other, image regions corresponding to each other in a plurality of images or image regions corresponding to each other in an image can be defined as regions of interest using the same figure by specifying two or more first reference pixels in an image, copying them onto the other image, and effecting template matching between minute region image data corresponding to a minute region containing the coordinate values of the two or more first reference pixels as center coordinate values and minute region image data corresponding to a minute region containing the coordinate values of two or more second reference pixels as center coordinate values.

In a preferred aspect of the present invention, the image data are data produced from the same object under different conditions.

In another preferred aspect of the present invention, the image data are data produced from different objects.

In a further preferred aspect of the present invention, the image data are data produced using a stimulable phosphor sheet.

In a further preferred aspect of the present invention, the image data are selected from the group consisting of radiation data of an object, autoradiographic image data, radiographic diffraction image data, electron microscope image data and chemiluminescent image data.

In a further preferred aspect of the present invention, the image data consist of fluorescent image data.

In the present invention, the stimulable phosphor usable for producing radiation image data of an object, autoradiographic image data, radiographic diffraction image data or electron microscope image data may be of any type insofar as it can store radiation energy or electron beam energy and can be stimulated by an electromagnetic wave to release the radiation energy or the electron beam energy stored therein in the form of light. More specifically, preferably employed stimulable phosphors include alkaline earth metal fluorohalide phosphors ($Ba_{1-x}$, $M^{2+x}$)FX:yA (where $M^{2+}$ is at least one alkaline earth metal selected from the group consisting of Mg, Ca, Sr, Zn and Cd; X is at least one element selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat.

No. 4,239,968, alkaline earth metal fluorohalide phosphors SrFX:Z (where X is at least one halogen selected from the group consisting of Cl, Br and I; Z is at least one Eu and Ce.) disclosed in Japanese Patent Application Laid Open No. 2-276997, europium activated complex halide phosphors BaFXxNaX':aEu$^{2+}$ (where each of X or X' is at least one halogen selected from the group consisting of Cl, Br and I; x is greater than 0 and equal to or less than 2; and y is greater than 0 and equal to or less than 0.2.) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br and I; and x is greater than 0 and equal to or less than 0.1.) disclosed in U.S. Pat. No. 4,539,137 and europium activated complex halide phosphors $M^{II}FXaM^{I}X'bM'^{II}X''_2cM'^{III}X'''_3xA:yEu^{2+}$ (where $M^{II}$ is at least one alkaline earth metal selected from the group consisting of Ba, Sr and Ca; $M^I$ is at least one alkaline metal selected from the group consisting of Li, Na, K, Rb and Cs; $M'^{II}$ is at least one divalent metal selected from the group consisting of Be and Mg; $M'^{III}$ is at least one trivalent metal selected from the group consisting of Al, Ga, In and Ti; A is at least one metal oxide; X is at least one halogen selected from the group consisting of Cl, Br and I; each of X', X" and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) disclosed in U.S. Pat. No. 4,962,047.

In the present invention, the stimulable phosphor employed for producing a chemiluminescent image data may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated sulfide-host phosphors, aluminate-host phosphors, silicate-host phosphors and fluoride-host phosphors disclosed in UK Patent Application 2,246,197 A. Among these listed phosphors, rare-earth-activated sulfide-host phosphors are preferable and rare-earth-activated alkaline earth metal sulfide-host phosphors disclosed in U.S. Pat. Nos. 5,029,253 and 4,983,834 are particularly preferable.

The above and other objects and features of the present invention will become apparent from the following description made with reference to the accompanying drawings.

DESCRIPTION OF THE PREFERRED EMBODIMENT

Figure 1:
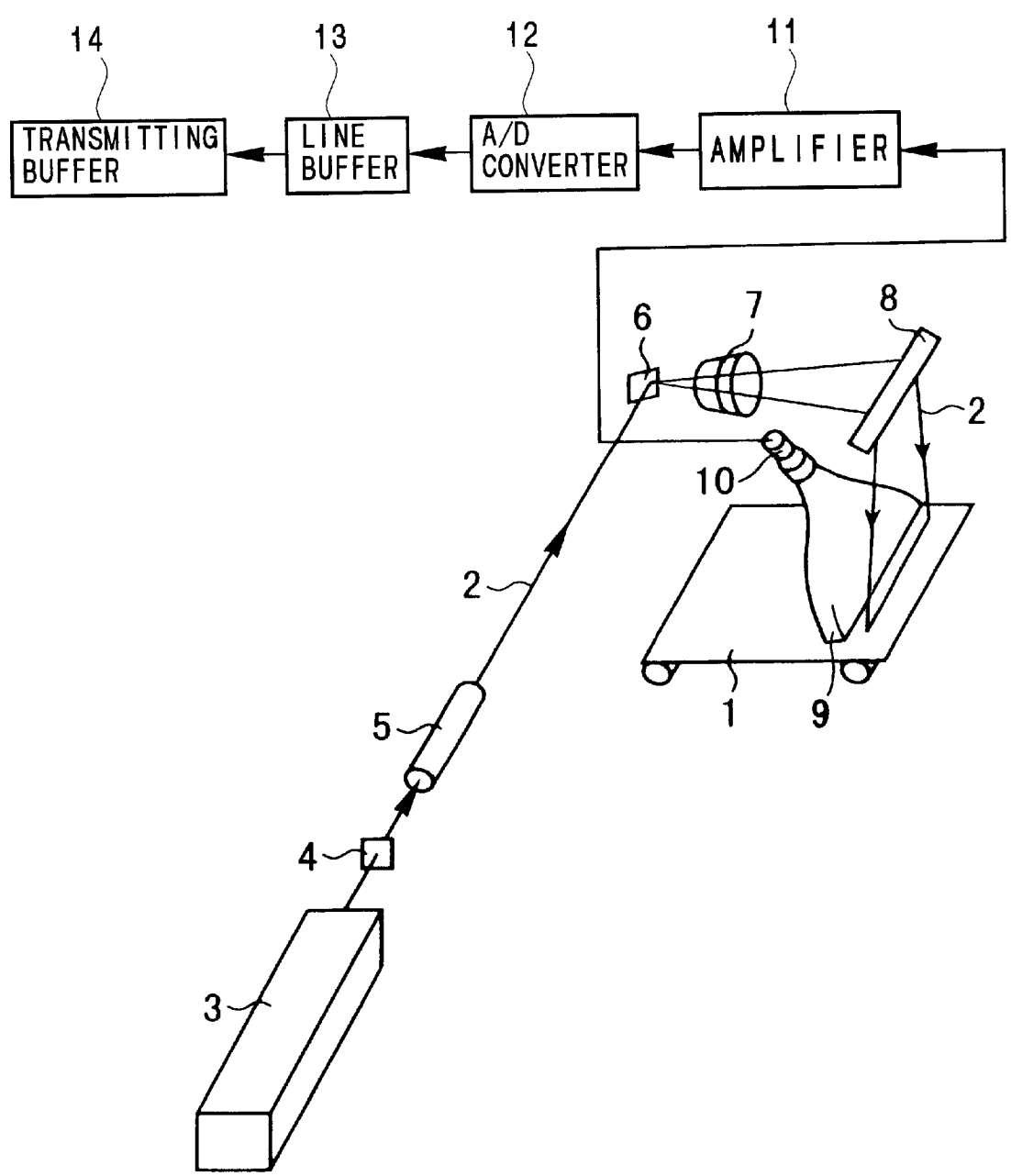
FIG. 1 is a schematic perspective view showing an image reading apparatus for producing image data to be processed by an image processing apparatus which is an embodiment of the present invention.

In FIG. 1, a stimulable phosphor sheet 1 stores, in the form of as a radiation energy, locational information regarding a radioactively labeling substance contained in an encephalon slice (not shown) of a test mouse gathered when a first predetermined time period, for example, one hour, has passed after drug labeled with a radioactively labeling substance was introduced into the test mouse.

Locational information as termed here includes a variety of information relating to the location of radioactive labeling substances, or aggregations thereof, present in a specimen, such as the location, the shape, the concentration, the distribution or combinations thereof.

The stimulable phosphor sheet 1 which stores the locational information regarding a radioactively labeling substance in the specimen is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an f$^x$ lens 7 and is reflected by a plane reflecting mirror 8, thereby one-dimensionally impinging upon the stimulable phosphor sheet 1. The f$^x$ lens 7 ensures that the stimulable phosphor sheet 1 is always scanned with the laser beam 2 at a uniform beam speed.

The stimulable phosphor sheet 1 is conveyed in the direction along the arrow in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as acrylic synthetic resin and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image processing apparatus.

Figure 2:
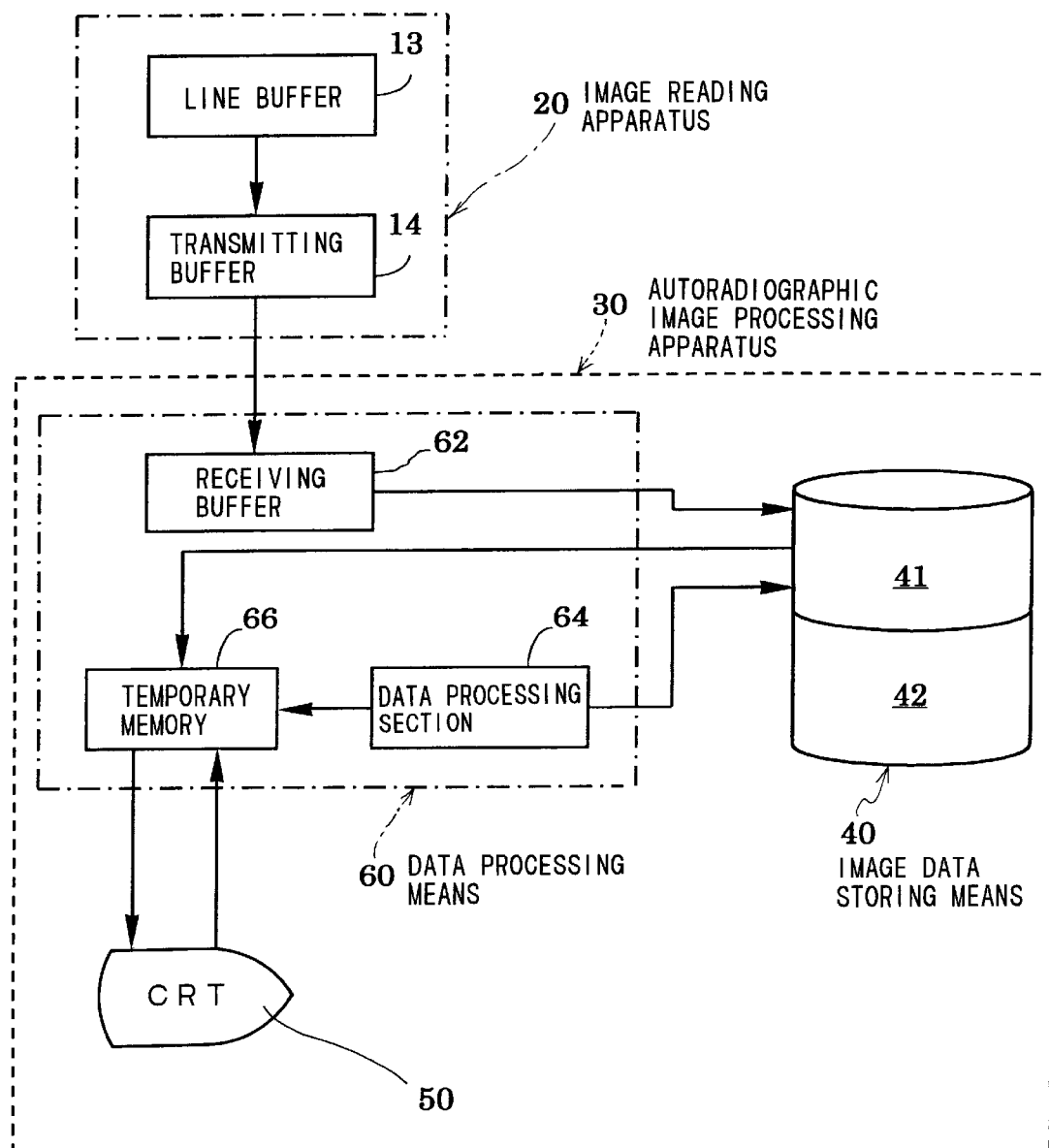
FIG. 2 is a block diagram of an image processing apparatus and an image reading apparatus.

FIG. 2 is a block diagram of the autoradiographic image processing apparatus which is a preferred embodiment of the present invention and an image reading apparatus.

As shown in FIG. 2, the autoradiographic image processing apparatus 30 includes data processing means 60 for receiving image data containing locational information regarding a radioactive labeling substance contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 40 for storing image data which were input to the data processing means 60 from the image reading apparatus 20 and processed thereby, and a CRT 50 for reproducing an image based on the image data containing locational information regarding a radioactive labeled substance contained in a specimen.

The image data temporarily stored in the transmitting buffer 14 of the image reading apparatus 20 are input to a receiving buffer 62 in the data processing means 60 of the autoradiographic image processing apparatus 30 and temporarily stored therein. When a predetermined amount of the image data have been stored in the receiving buffer 62, the stored image data are output to an image data temporary storing section 41 in the image data storing means 40 and stored therein. In this manner, the image data fed from the transmitting buffer 14 of the image reading apparatus 20 to the receiving buffer 62 of the data processing means 60 and temporarily stored therein are fed from the transmitting buffer 14 to the image data temporary storing section 41 in the image data storing means 40. When the image data obtained by scanning the whole surface of the stimulable phosphor sheet 1 with the laser beam 2 have been stored in the image data temporary storing section 41 in the image data storing means 40, the data processing section 64 in the data processing means 60 reads the image data from the image data temporary storing section 41 and stores them in a temporary memory 66 in the data processing means 60. After the image data were subjected to necessary data processing in the data processing section 64, the data processing section 64 stores only the processed image data in an image data storing section 42 in the image data storing means 40. The data processing section 64 then erases the image data stored in the image data temporary storing section 41.

Similarly, the stimulable phosphor sheet 1 is scanned with a laser beam 2, which stores, in the form of radiation energy, locational information regarding a radioactively labeling substance contained in an encephalon slice (not shown) of a test mouse gathered when a second predetermined time period, for example, two hours, has passed after drug labeled with a radioactively labeling substance was introduced into the test mouse, thereby producing image data, and the thus produced image data are stored in the image data storing section 42 in the image data storing means 40.

The image data stored in the image data storing section 42 in the image data storing means 40 can be read by the data processing section 64 and displayed on the screen of the CRT 50 so that an operator can view and analyze the image.

Figure 3:
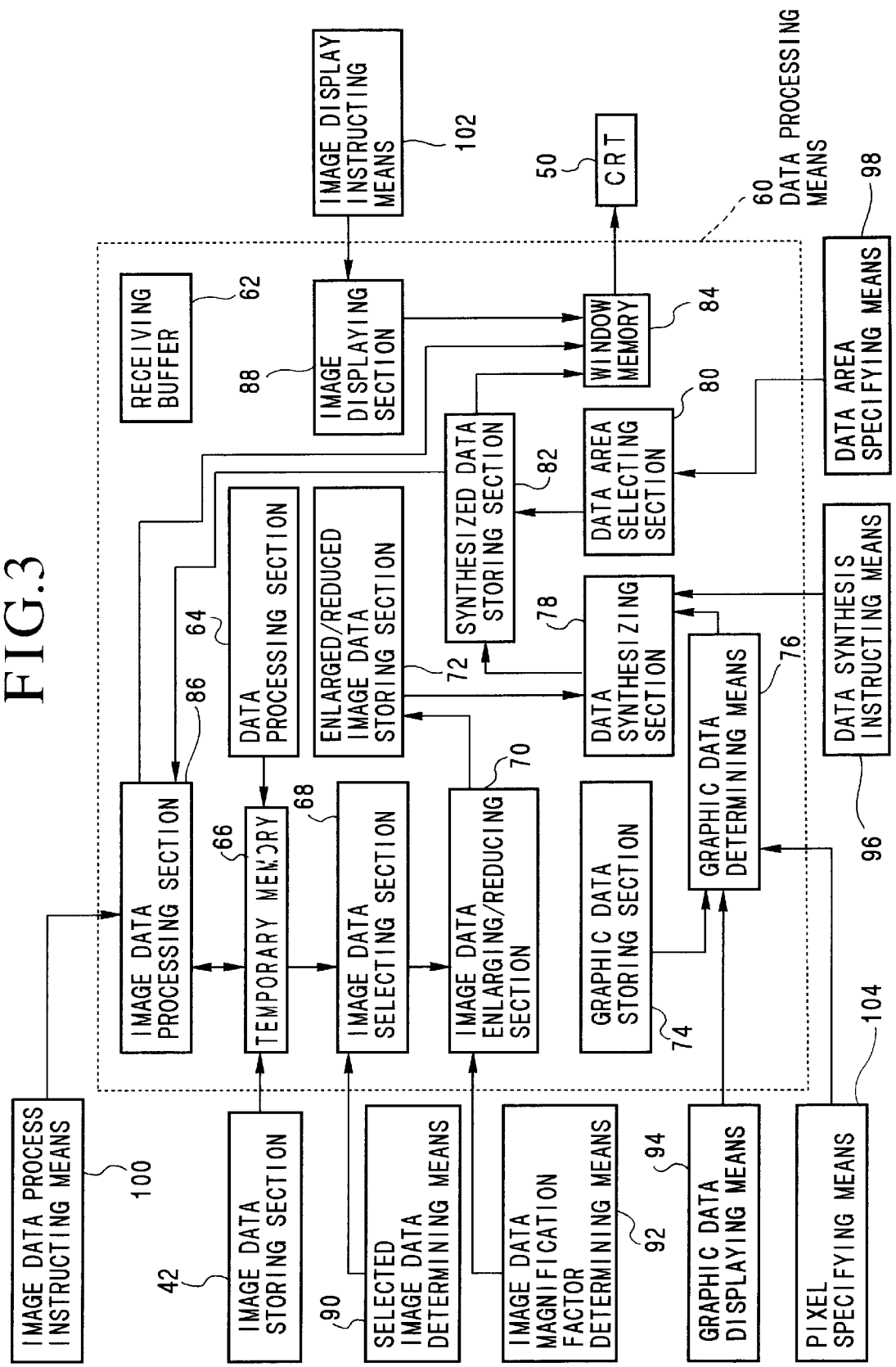
FIG. 3 is a block diagram of data processing means.

FIG. 3 is a block diagram of the data processing means 60 which is an embodiment of the present invention.

As shown in FIG. 3, the data processing means 60 includes the receiving buffer 62 for receiving image data from the transmitting buffer 14 in the image reading apparatus 20, the data processing section 64 for effecting data processing and the temporary memory 66 for temporarily storing image data. The temporary memory 66 is adapted to two-dimensionally map image data and temporarily store them and has a memory capacity for two-dimensionally mapping image data read from a plurality of stimulable phosphor sheets and temporarily storing them at the same time.

The data processing means 60 further includes an image data selecting section 68 for selecting a part of the image data from among the image data temporarily stored in the temporary memory 66, an image data enlarging/reducing section 70 for enlarging or reducing the image data selected by the image data selecting section 68, an enlarged/reduced image data storing section 72 for two-dimensionally mapping and temporarily storing the image data enlarged or reduced by the image data enlarging/reducing section 70, a graphic data storing section 74 for storing various graphic data to be displayed on the CRT 50, a graphic data determining section 76 for selecting predetermined graphic data from among the graphic data stored in the graphic data storing section 74 and specifying the position and the size of the graphic data in order to superpose them on the image data two-dimensionally mapped and temporarily stored in the enlarged/reduced image data storing section 72, a data synthesizing section 78 for synthesizing the image data temporarily stored in the enlarged/reduced image data storing section 72 and the graphic data selected and whose position and size have been specified by the graphic data determining section 76, a synthesized data storing section 82 for two-dimensionally mapping and temporarily storing the image data and the graphic data synthesized by the data synthesizing section 78, a data area selecting section 80 for selecting a predetermined data area from among the image data and the graphic data temporarily stored in the synthesized image data storing section 80, a window memory 84 for two-dimensionally mapping and temporarily storing the data in the data area of the image data and graphic data selected by the data area selecting section 80, an image data processing section 86 for processing image data stored in the temporary memory 66, and an image displaying section 86 for reproducing an image on the screen of the CRT 50 based on the image data and the graphic data two-dimensionally mapped and temporarily stored in the window memory 84.

An image data selecting signal is input to the image data selecting section 68 from selected image data determining means 90, and an enlarging/reducing signal is input to the image data enlarging/reducing section 70 from image data magnification factor determining means 92. Further, a graphic data displaying signal from graphic data displaying means 94 and a pixel specifying signal from a pixel specifying means 104 are input to the graphic data determining section 76 and a data synthesizing signal is input to the data synthesizing section 78 from data synthesis instructing means 96 which determines what graphic data should be selected and how the image data and the graphic data are to be synthesized to be displayed on the CRT 50. Moreover, a data area specifying signal is input to the data area selecting section 80 from data area specifying means 98 and an image display instructing signal is input to the image displaying section 88 from image display instructing means 102. An image data processing signal is input to the image data processing section 88 from an image data process instructing means 100.

In this embodiment, the selected image data determining section 90, the image data magnification factor determining section 92, the graphic data displaying means 94, the data synthesis instructing means 96, the data area specifying means 98, the image display instructing means 102, the image data process instructing means 100 and the pixel specifying mean 104 can be operated by a mouse (not shown).

The thus constituted image processing apparatus 30 defines a region of interest in an image displayed on the screen of the CRT 50 based on image data and graphic data stored in the image data storing means 40 in the following manner.

First, image data stored in the image data storing section 42 are two-dimensionally mapped and temporarily stored in the temporary memory 66. When the selected image data determining means 90 is operated, a part of the image data two-dimensionally mapped and stored in the temporary memory 66 are selected and two-dimensionally mapped and temporarily stored in the image data selecting section 68. The image data two-dimensionally mapped and stored in the image data selecting section 68 are then two-dimensionally mapped and stored in the enlarged/reduced image data storing section 72 without being enlarged or reduced and two-dimensionally mapped and stored in the synthesized data storing section 82 without being synthesized with any graphic data. The image data two-dimensionally mapped and stored in the synthesized data storing section 82 are two-dimensionally mapped and stored in the window memory 84 and an image is displayed on the screen of the CRT 50 based on the image data by operating the image display instructing means 102.

The user views the image displayed on the screen of the CRT 50 and, as occasion demands, operates the image data magnification factor determining means 92, thereby enlarging or reducing the image data two-dimensionally mapped and stored in the image data selecting section 68 and two-dimensionally mapping and storing the image data in the enlarged/reduced image data storing section 72. The image data two-dimensionally mapped and stored in the enlarged/reduced image data storing section 72 are then read out by the data synthesizing section 78 to be two-dimensionally mapped and stored in the synthesized data storing section 82. When the user specifies a part of region of the image data two-dimensionally mapped and stored in the synthesized data storing section 82 by operating the data area specifying means 98, the thus specified image data are forwarded into the window memory 84 and two-dimensionally mapped and stored therein. When the image display instructing means 102 is operated, an image is displayed on the screen of the CRT 50 by the image displaying section 88.

Figure 4:
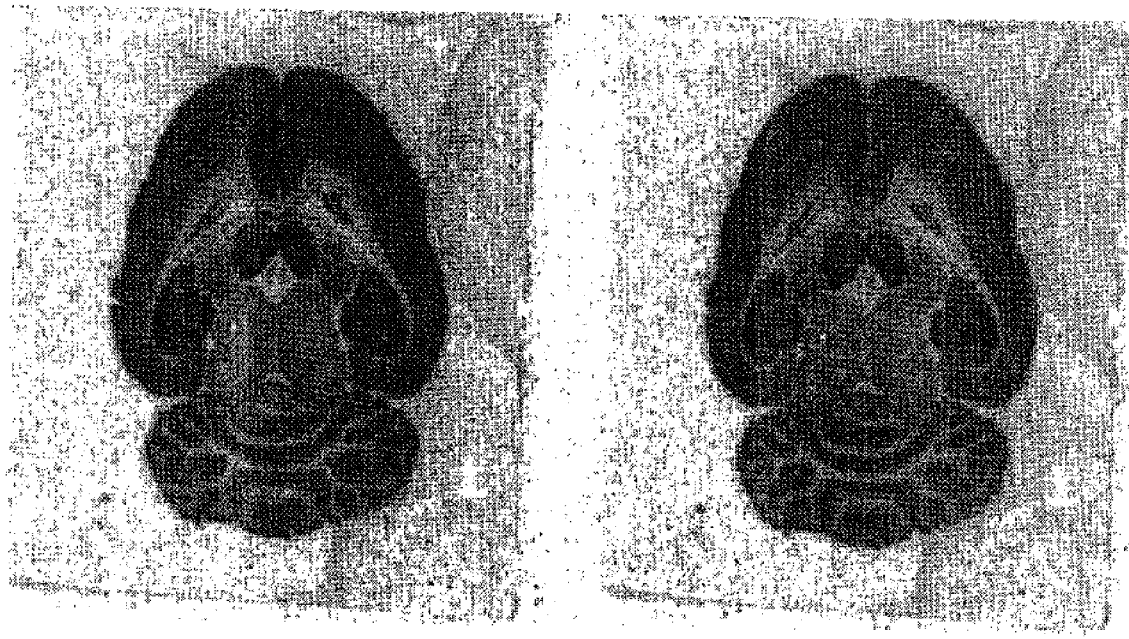
FIG. 4 shows a first autoradiographic image and a second autoradiographic image of a radioactively labeling substance contained in the encephalon slice of a test mouse and displayed on the screen of a CRT.

FIG. 4 shows an autoradiographic image of the radioactively labeling substance contained in the encephalon slice of a test mouse and displayed on the screen of the CRT 50. By way of example, FIG. 4 shows two images of the encephalon slices displayed on the screen of the CRT 50 based on image data selected by the selected image data determining means 90 and the data area specifying means 98 from among image data produced by reading out locational information regarding a radioactively labeling substance contained in the encephalon slice of a test mouse gathered when a first predetermined time period, for example, one hour, has passed after a drug labeled with a radioactively labeling substance was introduced into the test mouse and stored in the stimulable phosphor 1 in the form of radiation energy and stored in the image data storing section 42, and image data produced by reading out locational information regarding a radioactively labeling substance contained in the encephalon slice of a test mouse gathered when a second predetermined time period, for example, two hours, has passed after a drug labeled with a radioactively labeling substance was introduced into the test mouse and stored in the stimulable phosphor 1 in the form of radiation energy and stored in the image data storing section 42.

As shown in FIG. 4, since the two images displayed on the screen of the CRT 50 indicate locational information regarding a radioactively labeling substance contained in the encephalon slice of a test mouse gathered when a first predetermined time period has passed after a drug labeled with a radioactively labeling substance was introduced into the test mouse and locational information regarding a radioactively labeling substance contained in the encephalon slice of a test mouse gathered when a second predetermined time period has passed after drug labeled with a radioactively labeling substance was introduced into the test mouse, they include image regions having the same shape. When these images are analyzed, corresponding image regions are often defined as regions of interest using the same figure in order to study the amount of the drug accumulated in a predetermined portion of the encephalon of the test mouse from a first predetermined time to a second predetermined time.

Therefore, the image processing apparatus according to this embodiment is constituted so that image regions in the two images which correspond to each other can be defined by the same figure as regions of interest.

First, the user manipulates the mouse (not shown) to draw a figure used for defining a region of interest in the images on the screen of the CRT 50 and select it. More specifically, when the user uses the mouse to operate the data synthesis instructing means 96, thereby instructing the synthesis of the image data and graphic data and manipulates the mouse to operate the graphic data displaying means 94, a graphic data displaying signal including positional information in accordance with the manipulation of the mouse is input to the graphic data determining section 76 so that the graphic data determining section 76 reads out graphic data corresponding to the positional information from the graphic data storing section 74 and the coordinate values thereof are stored therein. The thus read out graphic data are read out to the data synthesizing section 78 and are synthesized with image data two-dimensionally mapped and stored in the enlarged/reduced image data storing section 72. The thus synthesized image data and graphic data are two-dimensionally mapped and stored in the synthesized data storing section 82 and forwarded to the window memory 84 to be two-dimensionally mapped and stored therein. When the image display instructing means 102 is operated, a figure is displayed on one of the images displayed on the screen of the CRT 50.

As a result, a predetermined image region in the image displayed on the CRT 50 based on the image data is defined by the figure as a region of interest.

Then, the user manipulates the mouse to specify a first characteristic reference pixel in the vicinity of a region of interest while he or she views the images displayed on the screen of the CRT 50. As a result, the pixel specifying means 104 is operated, whereby a first reference pixel data display signal including locational information of the first reference pixel is input to the graphic data determining section 76 and first characteristic region pixel data consisting of pixel data of a predetermined number of pixels containing the first pixel as a center pixel are read out by the graphic data determining section 76 from the graphic data storing section 74 based on the locational information of the first reference pixel and the coordinate values thereof are stored therein. The thus read out first characteristic region pixel data are read by the data synthesizing section 78 and two-dimensionally mapped in the enlarged/reduced image data storing section 72 and synthesized with the image data and the graphic data stored therein. The thus synthesized image data, graphic data and first characteristic region pixel data are two-dimensionally mapped and stored in the synthesized data storing section 82 and are then two-dimensionally mapped and stored in the window memory 84. When the image display instructing means 102 is operated, a first characteristic region pixel group consisting of the predetermined number of pixels containing the first pixel as a center pixel is displayed on the image displayed on the screen of the CRT 50 together with a figure for defining a region of interest.

The coordinate values of the image data, the graphic data and the first characteristic region pixel data two-dimensionally mapped and stored in the synthesized data storing section 82 are input to the image data processing section 86.

Figure 5:
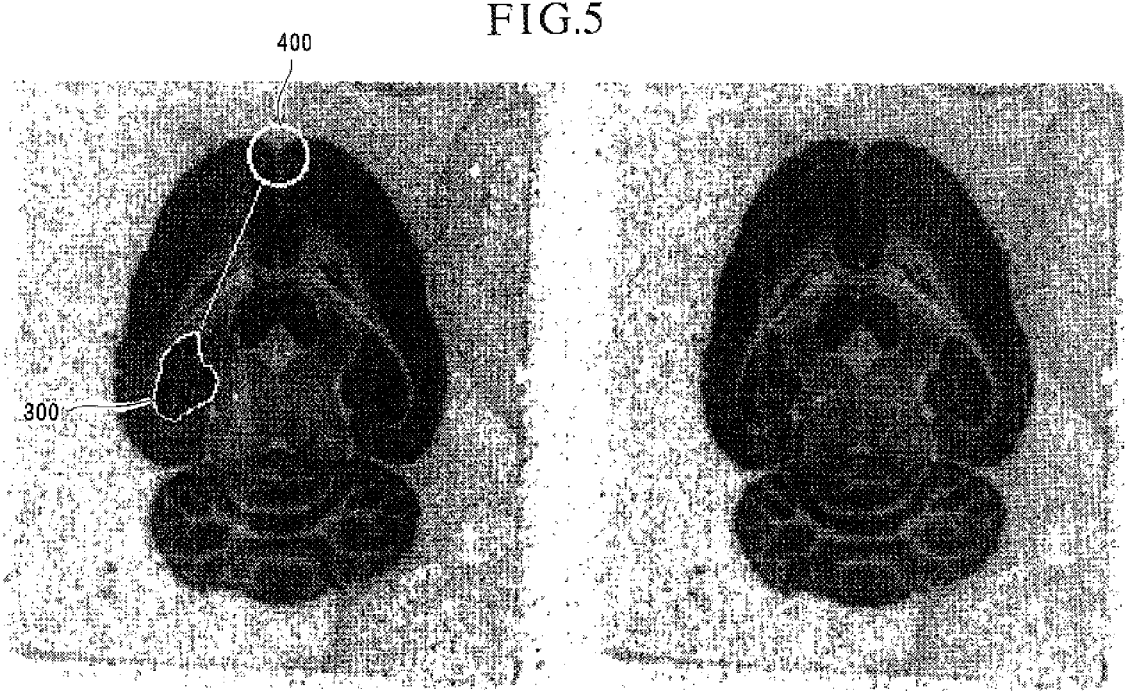
FIG. 5 shows the screen of a CRT on which an image region in a first autoradiographic image is defined by a figure as a region of interest.

FIG. 5 shows the screen of the CRT on which the image region in a first image is defined by the figure as a region 300 of interest and the first characteristic region pixel group 400 is displayed.

When the user manipulates the mouse to specify a second reference pixel in a second image which appears to correspond to the first reference pixel positioned at the center of the characteristic region pixel group 400 in the first image while he or she views the second image displayed on the screen of the CRT 50, a pixel specifying signal is input to the pixel specifying section 104.

As a result, the pixel specifying section 104 is operated, whereby a second reference pixel data display signal including locational information of the specified second reference pixel is input to the graphic data determining section 76 and second characteristic region pixel data consisting of pixel data of a predetermined number of pixels containing the second pixel as a center pixel are read out by the graphic data determining section 76 from the graphic data storing section 74 based on the locational information of the second reference pixel and the coordinate values thereof are stored therein.

Further, when the user inputs a copy signal to the graphic data displaying means 94, the graphic date determining section 76 converts the coordinate values the graphic data stored and used for defining the region 300 of interest so that the coordinate values of the first characteristic region pixel data become equal to the coordinate values of the second characteristic region pixel data corresponding to the predetermined number of pixels containing the second pixel specified by the pixel specifying signal as a center pixel and outputs the graphic data whose coordinate values have been converted and the second characteristic region pixel data to the data synthesizing section 78.

The graphic data and the second characteristic region pixel data output to the data synthesizing section 78 are synthesized by the data synthesizing section 78 with the image data two-dimensionally mapped and stored in the enlarged/reduced image data storing section 72. The thus synthesized data are two-dimensionally mapped and stored in the synthesized data storing section 82 and are then two-dimensionally mapped and stored in the window memory 84. When the image display instructing means 102 is operated, copied FIG. 600 and the second characteristic region pixel group 500 are displayed on the second image displayed on the screen of the CRT 50.

The coordinate values of the image data, the copied graphic data and the second characteristic region pixel data two-dimensionally mapped and stored in the synthesized data storing section 82 are input to the image data processing section 86.

Figure 6:
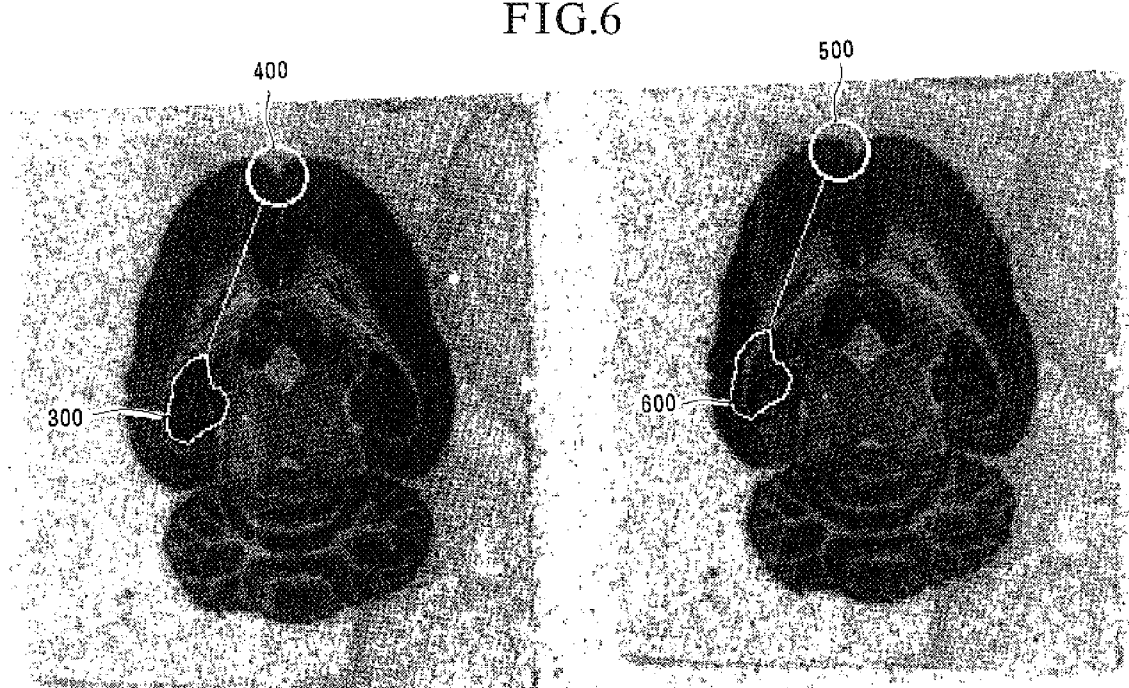
FIG. 6 shows the screen of a CRT on which a figure is displayed in a second image by copying a figure used for defining a region of interest in a first image.

FIG. 6 shows the screen of the CRT 50 on which the FIG. 600 is displayed in the second image by copying the figure used for defining the region 300 of interest in the first image.

As shown in FIG. 6, although the second characteristic region pixel group 500 is displayed in the second image together with the figure used for defining the region 300 of interest, the position of the second characteristic region pixel group 500 does not exactly correspond to that of the first characteristic region pixel group 400 in the first image and the position of the FIG. 600 does not correspond to that of the region 300 of interest.

Therefore, in this embodiment, the image data processing section 86 is constituted so as to utilize the correlation between the image data of the first characteristic region pixel group 400 in the first image and those of the second characteristic region pixel group in the second image in order to define the corresponding image regions in the first image and the second image as the region 300 of interest and the region 600 of interest using the same figure and to move the second characteristic region pixel group 500 and the region 600 of interest so that the region 600 of interest in one image coincides with the region 300 of interest in the other image.

Figure 7:
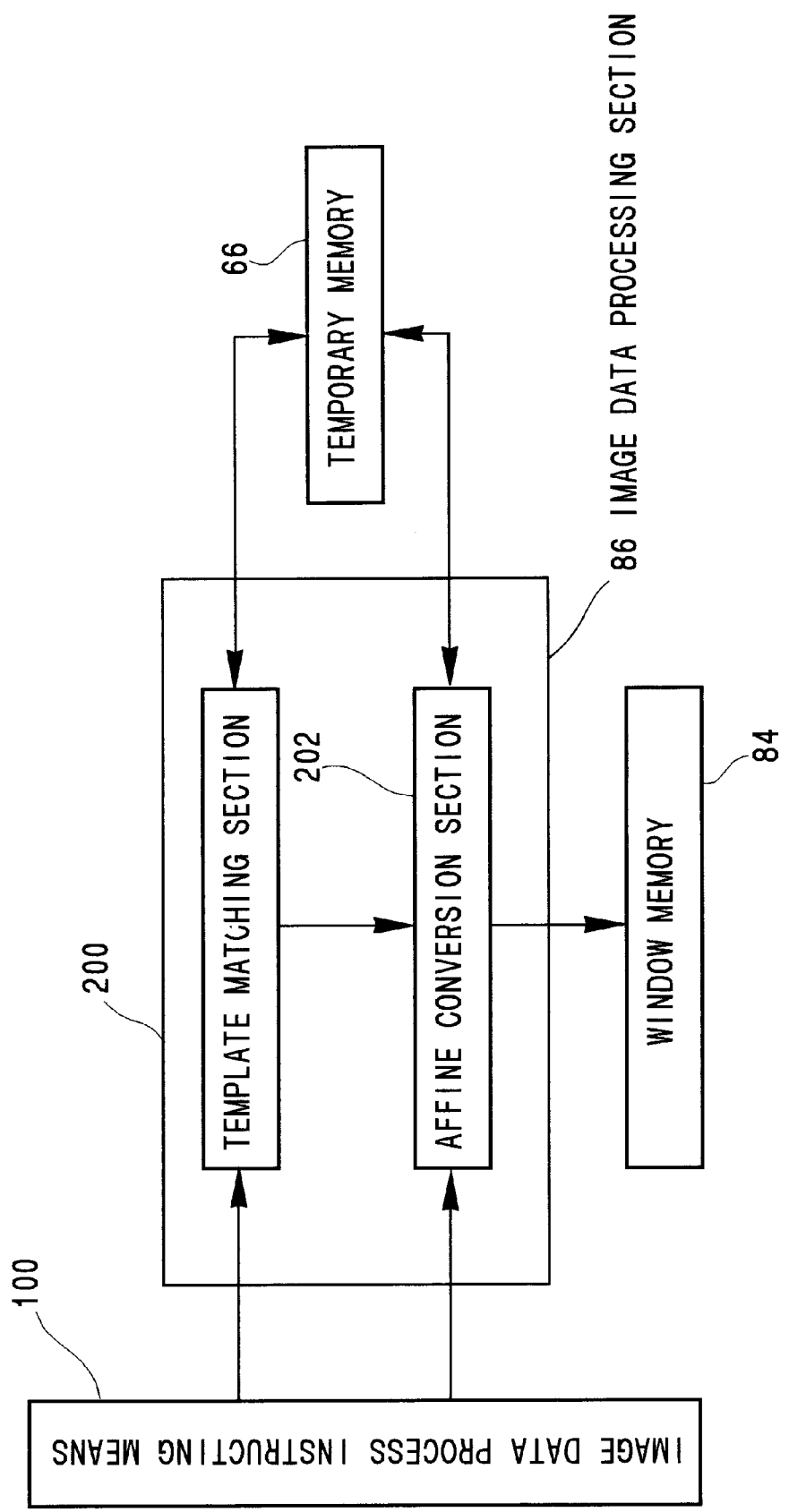
FIG. 7 is a block diagram of an image data processing section.

FIG. 7 is a block diagram of the image data processing section 86.

As shown in FIG. 7, the image data processing section 86 includes a template matching section 200 for reading out image data corresponding to pixels in the vicinity of the first reference pixel 400 and image data corresponding to pixels in the vicinity of the second characteristic region pixel group 500 and effecting template matching therebetween and an affine conversion section 202 for effecting an affine conversion on the image data corresponding to the second characteristic region pixel group 500 in one of the image data sets stored in the temporary memory 66 in accordance with the result produced by the template matching section 200.

When the image data processing instructing means 100 is operated by the user, the template matching section 200 effects template matching between image data in a minute template region consisting of the second characteristic region pixel group 500, namely, a predetermined number of pixels containing the second reference pixel as a center pixel, for example, 200×200 pixels, and image data in a minute reference region consisting of the first characteristic region pixel group 400, namely, the same number of pixels containing the first reference pixel as a center pixel as that of the second characteristic region pixel group.

As well known, template matching is effected based on the correlation method or the like, thereby producing coefficients for carrying out an affine conversion.

In this embodiment, as shown in FIG. 6, since the second image is merely translated in parallel with respect to the first image, deviations in position of image data corresponding to an image to be superposed with respect to image data corresponding to the reference image can be corrected in accordance with the following formula.

$$\begin{pmatrix} xa \\ ya \end{pmatrix} = \begin{pmatrix} xb \\ yb \end{pmatrix} + \begin{pmatrix} a \\ b \end{pmatrix}$$

wherein xa and ya designate the coordinate values of the first characteristic region pixel group 400, namely, the reference region containing the first reference pixel as a center pixel, xb and yb designate the coordinate values of the second characteristic region pixel group 500, namely, the template region containing the second reference pixel as a center pixel, and a and b designate amounts of the translation of the image containing the template region with respect to the reference region.

In case where the affine conversion is effected in accordance with the above formula, as well known in the art, two corresponding pixels in each region are specified and template matching is effected on image data of predetermined regions containing the respective pixels based on the correlation method or the like in order to shorten the processing time.

The coefficients a and b obtained by the template matching made by the template matching section 200 are output to the affine conversion section 202 and the affine conversion section 202 reads out image data containing the template region from among image data two-dimensionally mapped and temporarily stored in the temporary memory 66 and effects the affine conversion thereon, thereby outputting the image subjected to the affine conversion to the temporary memory 66.

As a result, the FIG. 600 for defining the second characteristic region pixel group 500 and the copied region of interest is displayed on the screen of the CRT 50 based on the image data containing the template region subjected to the affine conversion.

Figure 8:
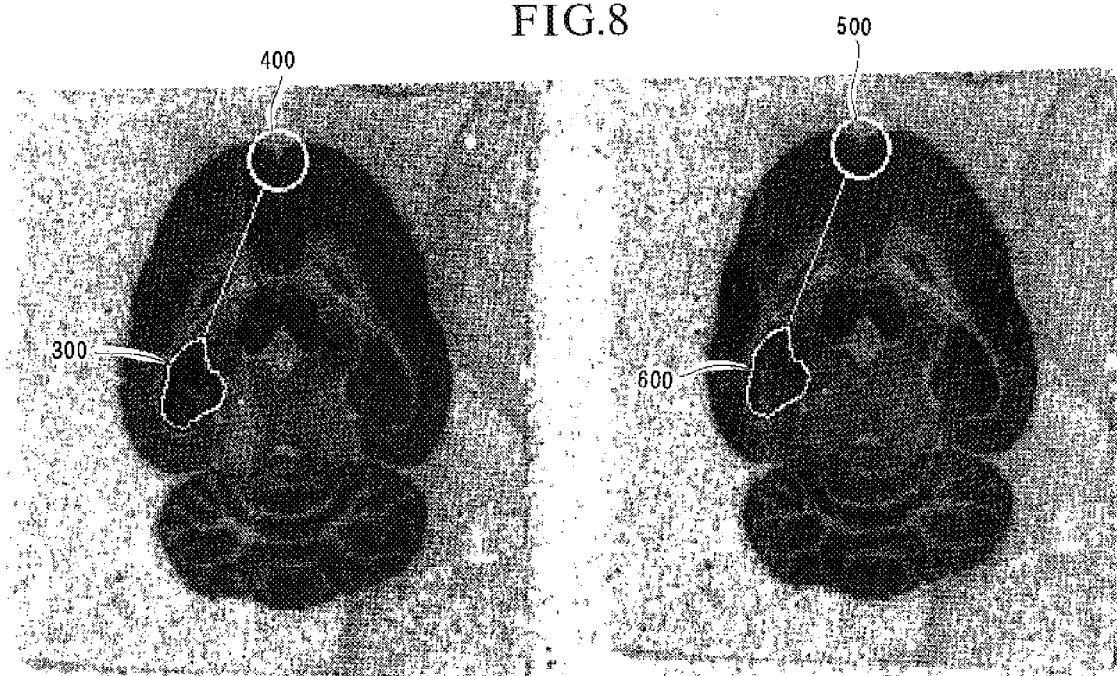
FIG. 8 shows the screen of a CRT on which a region of interest is defined in a second autoradiographic image so that a region of interest in a first autoradiographic image and the region of interest in the second autoradiographic image coincide perfectly with each other.

FIG. 8 shows the screen of the CRT 50 on which the second image based on the thus obtained image data is displayed together with the first image. As shown in FIG. 8, the region 600 of the interest is defined so that the region 300 of interest and the first characteristic region pixel group 400 in the first image exactly correspond to the region 600 of interest and the second characteristic region pixel group 500 in the second image.

According to the above described embodiment, the user specifies the first reference pixel which appears to be located at the center of the characteristic image region in the vicinity of the region 300 of interest, while he or she views the first image in which the region 300 of interest displayed on the screen of the CRT 50 is displayed. The user further specifies the second reference pixel which appears to be located at the center of the second characteristic region pixel group 500 corresponding to the first characteristic region pixel group 400 in the second image displayed on the screen of the CRT 50. Then, merely by effecting template matching between the second characteristic region pixel group 500, namely, image data in the minute template region containing the second reference pixel as a center pixel, and the first characteristic region pixel group 400, namely, image data in the reference region containing the first reference pixel as a center pixel, the image regions corresponding to each other in the first image and the second image can be defined using the same figure as the region 300 of interest and the region 600 of interest. Therefore, corresponding image regions in a plurality of images can be very efficiently defined as regions of interest in a desired manner.

Figure 9:
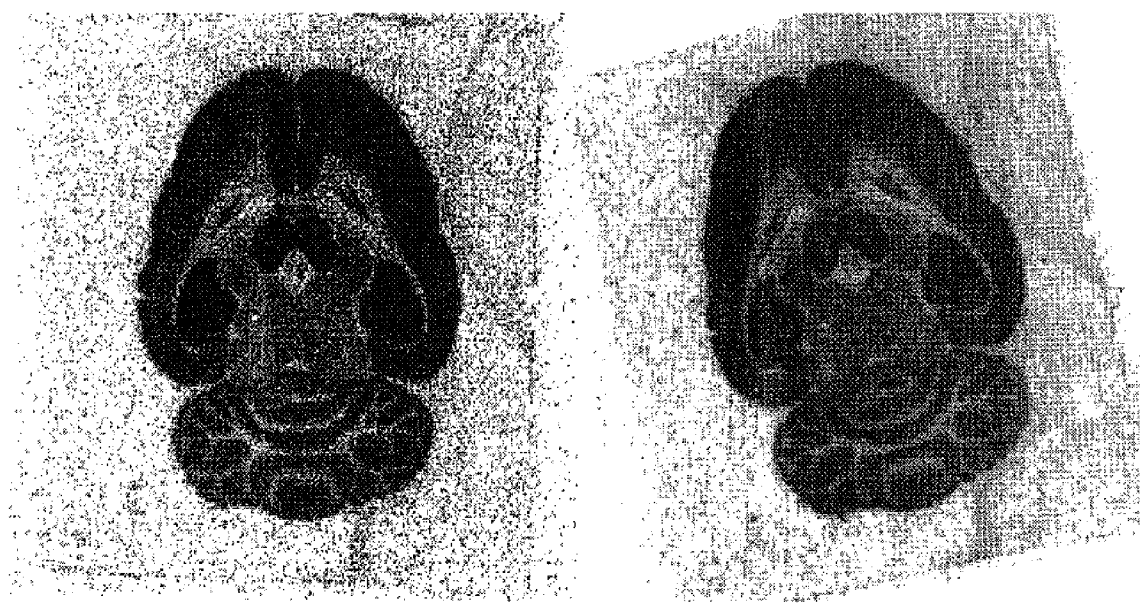
FIG. 9 shows the screen of a CRT on which a first autoradiographic image and a second autoradiographic image of a radioactively labeling substance contained in encephalon slices of a test mouse are produced to be rotated with respect to each other.

FIG. 9 shows the screen of the CRT 50 on which a second image regarding an encephalon slice of a test mouse is produced to be rotated with respect to a first image.

In the case where, for example, two encephalon slices of a test mouse labeled with a radioactively labeling substance are superposed on a stimulable phosphor sheet to expose the stimulable phosphor sheet with the radioactively labeling substance, if the two encephalon slices are oriented in different directions, images produced based thereon are rotated relative to each other. In such a case, a region of interest in a second image cannot be moved to a position corresponding to that of a region of interest in a first image even if template matching is effected between image data in the minute template region containing the second reference pixel as a center pixel in the second image and image data in the minute reference region containing the first reference pixel as a center pixel in the first image.

Figure 10:
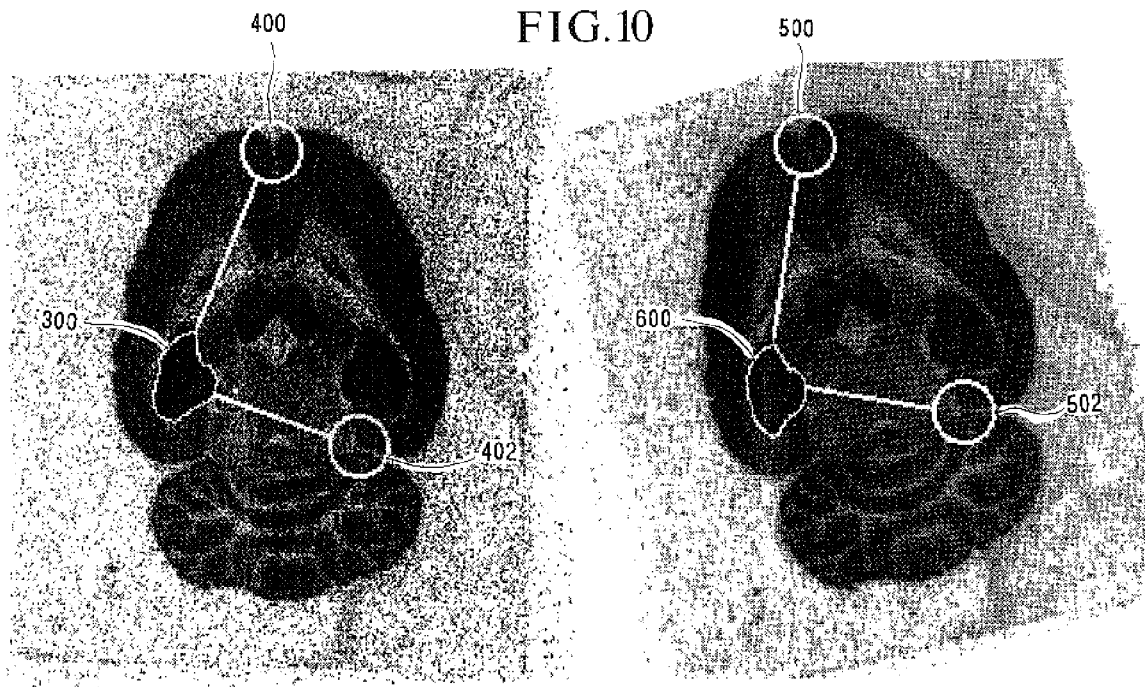
FIG. 10 shows the screen of a CRT on which a region of interest is defined in a second autoradiographic image so that a region of interest in a first autoradiographic image and the region of interest in the second autoradiographic image coincide perfectly with each other.

Therefore, this embodiment is constituted so as to define a region of interest in a second image at a position corresponding to that of a region of interest in a first image in the following manner. The user specifies a pair of first reference pixels in a first image as well as a pair of reference pixels in a second image. The template matching section 200 effects template matching between one of the pair of second characteristic region pixel groups 500, 502 (FIG. 10) each consisting of a predetermined number of pixels containing one of the second reference pixels as a center pixel, namely, image data in a minute template region corresponding to the characteristic region pixel group 500 containing one of the second reference pixel as a center pixel, and one of the pair of first characteristic region pixel groups 400, 402 each consisting of a predetermined number of pixels containing one of the first reference pixels as a center pixel in the first image, namely, image data in a minute reference region corresponding to the characteristic region pixel group 400 containing one of the first reference pixels as a center pixel in accordance with the following formula. The template matching section 200 further effects template matching between the other of the pair of second characteristic region pixel groups 500, 502, namely, image data in a minute template region corresponding to the characteristic region pixel group 502 containing the other second reference pixel as a center pixel, and the other of the pair of first characteristic region pixel groups 400, 402 consisting of a predetermined number of pixels containing the other first reference pixel as a center pixel in the first image, namely, image data in a minute reference region corresponding to the characteristic region pixel group 402 containing the other first reference pixel as a center pixel in accordance with the following formula. As a result, as shown in FIG. 10, a region 600 of interest in the second image can be defined at a position corresponding to that of the region 300 of interest in the first image.

$$\begin{pmatrix} xa \\ ya \end{pmatrix} = \begin{pmatrix} \cos\theta\sin\theta \\ -\sin\theta\cos\theta \end{pmatrix} \begin{pmatrix} xb \\ yb \end{pmatrix} + \begin{pmatrix} a \\ b \end{pmatrix}$$

wherein xa and ya designate the coordinate values of the reference region containing the first reference pixel as a center pixel, xb and yb designate the coordinate values of the template region containing the second reference pixel as a center pixel, designates a rotation angle of the image region containing the template region with respect to the reference region, and a and b designate amounts of translation of the image containing the template region with respect to the reference region.

According to the above described embodiment, the user specifies the pair of first reference pixels in the first image displayed on the screen of the CRT 50 to determine the pair of first characteristic region pixel groups 400, 402 as well as the pair of reference pixels in the second image to determine the pair of second characteristic region pixel groups 500, 502. Template matching is effected in accordance with the above formula between one of the pair of second characteristic region pixel groups 500, 502 each consisting of a predetermined number of pixels containing one of the second reference pixels as a center pixel, namely, image data in the minute template region corresponding to the characteristic region pixel group 500 containing one of the second reference pixels as a center pixel, and one of the pair of first characteristic region pixel groups 400, 402 each consisting of a predetermined number of pixels containing one of the first reference pixels as a center pixel in the first image, namely, image data in the minute reference region corresponding to the characteristic region pixel group 400 containing one of the first reference pixels as a center pixel. Template matching is further effected in accordance with the above formula between the other of the pair of second characteristic region pixel groups 500, 502, namely, image data in the minute template region corresponding to the characteristic region pixel group 502 containing the other second reference pixel as a center pixel, and the other of the pair of first characteristic region pixel groups 400, 402 consisting of a predetermined number of pixels containing the other first reference pixel as a center pixel in the first image, namely, image data in the minute reference region corresponding to the characteristic region pixel group 402 containing the other first reference pixel as a center pixel in accordance with the foregoing formula. Therefore, since the region 600 of interest can be defined in the second image at a position corresponding to that of the region 300 of interest in the first image merely by effecting the above mentioned template matching, even when a plurality of images are rotated relative to each other, corresponding image regions in a plurality of images can be easily defined using the same figure as a region 300 of interest and a region 600 of interest.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, corresponding image regions in the image of locational information regarding a radioactively labeling substance contained in an encephalon slice of a test mouse gathered when a first predetermined time period has passed after a drug labeled with a radioactively labeling substance was introduced into the test mouse and the image of locational information regarding a radioactively labeling substance contained in an encephalon slice of a test mouse gathered when a second predetermined time period has passed after a drug labeled with a radioactively labeling substance was introduced into the test mouse are defined using the same figure as the region 300 of interest and the region 600 of interest. However, the present invention is in no way limited to the defining of corresponding image regions in a plurality of autoradiographic images produced from the same object as regions of interest but can also be applied to various other ways of the defining of regions of interest. Specifically, if it is necessary to define image regions having similar shape using the same figure as regions of interest, the present invention can also be applied to not only defining of regions of interest among a plurality of images produced from the same object but also superimposing of symmetrical image regions in an image such as an autoradiographic image of an encephalon slice of a test mouse, defining of regions of interest in an autoradiographic image of electrophoresed gene and the like. Further, the present invention is not limited to autoradiographic images but is applicable to, for example, a radiation image of an object, a radiographic diffraction image, an electron microscope image, a chemiluminescent image, or a fluorescent image.

Further, in the above described embodiments, a copy of graphic data are produced by converting the coordinate values of graphic data used for defining the region 300 of interest so that the coordinate values of the first characteristic region pixel group 400 consisting of a predetermined number of pixels containing the first reference pixel as a center pixel become equal to the coordinate values of the second characteristic region pixel group 500 consisting of a predetermined number of pixels containing the second reference pixel as a center pixel. However, the method for copying graphic data is arbitrary and not limited to such a method. Graphic data may be also copied by specifying one pixel as a reference pixel in the graphic data used for defining the region 300 of interest, specifying a pixel corresponding to the reference pixel at a portion where a region of interest is to be defined in a second image displayed on the screen of the CRT 50, and converting the coordinate values of the graphic data used for defining the region 300 of interest and the coordinate values of the first reference pixel data so that the coordinate values of the reference pixel in the first image become equal to those of the pixel specified in the second image.

Moreover, in the above described embodiments, although corresponding image regions in two images are defined using the same figure as regions of interest, the present invention can be applied to definition of three regions of interest.

Further, in the above described embodiments, although a visible image is displayed on the screen of the CRT 50 based on the image data produced by converting locational information regarding a radioactively labeling substance contained in a specimen into electrical signals using a stimulable phosphor sheet 1, after a visible image is once produced using a photographic film instead of the stimulable phosphor sheet 1, the visible image can be photoelectrically read, thereby converting it to image data in the form of electrical signals and similar processing may be effected on the thus produced image data.

Moreover, in the above described embodiments, although the CRT 50 is employed as a display means, instead of a CRT 50, a flat display panel such as a liquid crystal display panel, an organic electro-luminescent display panel or the like may be employed as a display means.

Further, in the above described embodiments, although a mouse is used as a pointing device, other pointing devices such as a track ball may be employed.

Furthermore, in the above described embodiments, although the light guiding sheet 9 made by processing a transparent thermoplastic resin sheet such as acrylic synthetic resin is used, a light guiding sheet made by processing a non-fluorescence glass, synthetic quartz or the like may be employed.

Moreover, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image processing apparatus which can easily define image regions corresponding to each other in a plurality of images or image regions corresponding to each other in an image as regions of interest using the same figure.

What is claimed is:

1. An image processing apparatus comprising a temporary memory means for two-dimensionally mapping and temporarily storing image data containing image region data corresponding to at least two image regions having a similar shape and stored in an image data storing means, a display means for reproducing images based on the image data stored in the temporary memory means, an interest region defining means for defining a region of interest in one of the at least two image regions having a similar shape displayed on the display means, a pixel specifying means for specifying at least one first reference pixel in the one of the at least two image regions having a similar shape and specifying a second pixel corresponding to the first reference pixel in at least one image region other than the one of the at least two image regions, a copy means for copying the region of interest defined by the interest region defining means and the at least one first reference pixel specified by the pixel specifying means, a template matching means for effecting template matching between minute region image data corresponding to a minute region containing the coordinate value of the at least one first reference pixel as a center coordinate value and minute region image data corresponding to a minute region containing the coordinate value of the at least one second reference pixel corresponding to the at least one first reference pixel as a center coordinate value, and an affine conversion means for effecting an affine conversion on image data corresponding to an outer periphery of the region of interest stored in the temporary memory means based on the result of the template matching made by the template matching means.

2. An image processing apparatus in accordance with claim 1 wherein the image data are data produced from the same object under different conditions.

3. An image processing apparatus in accordance with claim 2 wherein the image data are data produced using a stimulable phosphor sheet.

4. An image processing apparatus in accordance with claim 3 wherein the image data are selected from the group consisting of radiation data of an object, autoradiographic image data, radiographic diffraction image data, electron microscope image data and chemiluminescent image data.

5. An image processing apparatus in accordance with claim 2 wherein the image data are selected from the group consisting of radiation data of an object, autoradiographic image data, radiographic diffraction image data, electron microscope image data and chemiluminescent image data.

6. An image processing apparatus in accordance with claim 2 wherein the image data consist of fluorescent image data.

7. An image processing apparatus in accordance with claim 1 wherein the image data are data produced from different objects.

8. An image processing apparatus in accordance with claim 7 wherein the image data are data produced using a stimulable phosphor sheet.

9. An image processing apparatus in accordance with claim 8 wherein the image data are selected from the group consisting of radiation data of an object, autoradiographic image data, radiographic diffraction image data, electron microscope image data and chemiluminescent image data.

10. An image processing apparatus in accordance with claim 7 wherein the image data are selected from the group consisting of radiation data of an object, autoradiographic image data, radiographic diffraction image data, electron microscope image data and chemiluminescent image data.

11. An image processing apparatus in accordance with claim 7 wherein the image data consist of fluorescent image data.

12. An image processing apparatus in accordance with claim 1 wherein the image data are data produced using a stimulable phosphor sheet.

13. An image processing apparatus in accordance with claim 12 wherein the image data are selected from the group consisting of radiation data of an object, autoradiographic image data, radiographic diffraction image data, electron microscope image data and chemiluminescent image data.

14. An image processing apparatus in accordance with claim 1 wherein the image data are selected from the group consisting of radiation data of an object, autoradiographic image data, radiographic diffraction image data, electron microscope image data and chemiluminescent image data.

15. An image processing apparatus in accordance with claim 1 wherein the image data consist of fluorescent image data.

* * * * *